US011799779B1

(12) United States Patent
Yungelson et al.

(10) Patent No.: US 11,799,779 B1
(45) Date of Patent: Oct. 24, 2023

(54) SESSION-BASED PACKET CAPTURE

(71) Applicant: Juniper Networks, Inc., Sunnyvale, CA (US)

(72) Inventors: Anna Yungelson, Lexington, MA (US); Dennis Gordon Montgomery, Burlington, MA (US); Kaushik Adesh Agrawal, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/452,533

(22) Filed: Oct. 27, 2021

Related U.S. Application Data

(60) Provisional application No. 63/106,765, filed on Oct. 28, 2020.

(51) Int. Cl.
*H04L 45/745* (2022.01)
*H04L 45/00* (2022.01)
(Continued)

(52) U.S. Cl.
CPC .......... *H04L 45/745* (2013.01); *H04L 45/123* (2013.01); *H04L 45/38* (2013.01);
(Continued)

(58) Field of Classification Search
CPC ... H04L 45/745; H04L 67/561; H04L 45/123; H04L 45/38; H04L 45/566; H04L 67/142
See application file for complete search history.

(56) References Cited

U.S. PATENT DOCUMENTS 7,508,764 B2   3/2009   Back et al.
7,739,330 B1   6/2010   Shafer et al.
(Continued)

FOREIGN PATENT DOCUMENTS

EP    3113424 A2     1/2017
WO    2013184846 A1  12/2013

OTHER PUBLICATIONS

"Transmission Control Protocol," Darpa Internet Program Protocol Specification, Information Sciences Institute, RFC 793, Sep. 1981, 91 pp.
(Continued)

*Primary Examiner* — Oleg Survillo
*Assistant Examiner* — Monishwar Mohan
(74) *Attorney, Agent, or Firm* — Shumaker & Sieffert, P.A.

(57) ABSTRACT

Techniques are disclosed for generating session-specific packet capture records. In one example, a first network device receives a first packet of a session between first and second client devices, the session comprising forward and reverse packet flows. The first network device modifies the first packet to include metadata comprising a packet capture indicator that indicates whether packet capture is to be performed for the session. The first network device stores at least a portion of the first packet and each subsequent packet of the session and forwards the modified first packet. A second network device receives the modified first packet and, based on the packet capture indicator, stores at least a portion of the first packet and each subsequent packet of the session in a session-specific packet capture record. The first and second network devices may generate, from the stored packet data, a packet capture record for the session.

19 Claims, 4 Drawing Sheets

(51) Int. Cl.
  *H04L 67/142* (2022.01)
  *H04L 45/12* (2022.01)
  *H04L 67/561* (2022.01)

(52) U.S. Cl.
  CPC .......... *H04L 45/566* (2013.01); *H04L 67/142* (2013.01); *H04L 67/561* (2022.05)

(56) References Cited

U.S. PATENT DOCUMENTS

| | | |
|---|---|---|
| 8,331,234 B1 | 12/2012 | Newton et al. |
| 9,014,034 B2 | 4/2015 | Frey et al. |
| 9,413,634 B2 | 8/2016 | Nadeau et al. |
| 9,641,435 B1 | 5/2017 | Sivaramakrishnan |
| 9,729,439 B2 | 8/2017 | MeLampy et al. |
| 9,729,682 B2 | 8/2017 | Kumar et al. |
| 9,755,960 B2 | 9/2017 | Moisand et al. |
| 9,762,485 B2 | 9/2017 | Kaplan et al. |
| 9,787,559 B1 | 10/2017 | Schroeder |
| 9,871,748 B2 | 1/2018 | Gosselin et al. |
| 9,898,317 B2 | 2/2018 | Nakil et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 2009/0238088 A1 | 9/2009 | Tan et al. |
| 2015/0281007 A1 | 10/2015 | Mihelich et al. |
| 2016/0050132 A1 | 2/2016 | Zhang |
| 2016/0164780 A1* | 6/2016 | Timmons ................ H04L 45/70 370/238 |
| 2016/0285713 A1* | 9/2016 | Merchant .............. H04L 43/028 |
| 2016/0359872 A1 | 12/2016 | Yadav et al. |
| 2017/0063681 A1* | 3/2017 | Kaplan ................... H04L 45/74 |
| 2017/0251065 A1* | 8/2017 | Furr ........................ H04L 45/64 |
| 2017/0346709 A1* | 11/2017 | Menon ................... H04L 45/70 |
| 2020/0007665 A1* | 1/2020 | Song ...................... H04L 69/22 |
| 2020/0280499 A1* | 9/2020 | Patil ....................... H04L 67/14 |
| 2020/0403890 A1 | 12/2020 | McCulley et al. |
| 2022/0191310 A1* | 6/2022 | Xie ....................... H04L 69/325 |

OTHER PUBLICATIONS

Boschi, et al., "Bidirectional Flow Measurement, IPFIX, and Security Analysis," FloCon 2006, Oct. 10, 2006, 12 slides.

Boschi, et al., "Bidirectional Flow Measurement, IPFIX, and Security Analysis," Oct. 2006, 4 pp.

Hopps, "Analysis of an Equal-Cost Multi-Path Algorithm," Network Working Group, RFC 2992, Nov. 2000, 8 pp.

Menon et al. "Secure Vector Reouting (SVR)," draft-menon-svr-00, Network Working Group, Internet-Draft, Oct. 1, 2021, 38 pp.

Minarik, et al., "Improving Host Profiling with Bidirectional Flows," 2009 International Conference on Computational Science and Engineering, Aug. 2009 IEEE, pp. 231-237.

Postel, "User Datagram Protocol," RFC 768, Aug. 28, 1980, 3 pp.

\* cited by examiner

SESSION-BASED PACKET CAPTURE

This application claims the benefit of U.S. Provisional Application No. 63/106,765, filed on Oct. 28, 2020, the entire content of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

Techniques are disclosed for generating session-specific packet capture records. Conventional packet capture techniques are performed on a per-packet flow basis. For example, a conventional router stores copies of packets (or portions thereof) and generates records of such stored packets organized by packet flow (e.g., such as by a 5-tuple header of the packet specifying a source address, source port, destination address, destination port, and network protocol of the packet). The router typically sends the packet flow records to a traffic flow collector, which uses the packet flow records to determine various aspects of the network traffic, which may be used to, e.g., perform traffic engineering, analytics and health monitoring, etc. However, transmitting packet records for each packet flow received by each router of the network may consume a large amount of network resources. Furthermore, records of individual packet flows do not provide a collector with a picture of the overall behavior of the bidirectional flow of traffic between the first client device and the second client device. For example, a flow-based packet record has the potential of being incomplete, e.g., by omitting packets of the reverse direction, thereby failing to provide an accurate depiction of the bidirectional flow of traffic. Additionally, conventional flow-based packet capture may not provide much specificity in the types of packets which are captured, thereby increasing the volume of data that is captured, thereby increasing the consumption of network resources when transmitting flow records and diluting the flow records with data that may not be relevant.

In accordance with the techniques of the disclosure, a plurality of routers may generate packet capture records on a per-session basis for each session comprising a forward packet flow and a reverse packet flow for which each router receives packets. In one example, a plurality of routers form a network connecting a first client device to a second client device. A first router of the plurality of routers receives, from the first client device, a first packet of a forward packet flow for a session between the first client device and the second client device. The session comprises the forward packet flow, which originates from the first client device and is destined for the second client device, and a reverse packet flow, which originates from the second client device and is destined for the first client device.

The first router modifies the first packet to include a header comprising a source address that is an address of the first router and a destination address that is an address of a second router of the plurality of routers, a first portion of metadata specifying a session identifier for the session, and a second portion of metadata comprising a packet capture indicator that indicates whether packet capture is to be performed for the session. The first router stores the packet capture indicator for the session. If the packet capture indicator indicates that packet capture is to be performed for the session, the first router stores, in a packet capture record for the session, at least a portion of the first packet. The first router then forwards the modified first packet to the second router.

The second router receives the modified first packet. The second router determines the modified first packet includes a first portion of metadata specifying the session identifier for the session and a second portion of metadata comprising the packet capture indicator and stores the session identifier and the packet capture indicator for the session. If the packet capture indicator indicates that packet capture is to be performed for the session, the second router stores, in a packet capture record for the session, at least a portion of the first packet. The second router then forwards the first packet to the second client device without the first portion of metadata or the second portion of metadata.

Subsequently, each of the first router and second router may receive a second packet, which may belong to the forward packet flow or the reverse packet flow of the session. Each router determines, based on the session information for the session stored by the router, that the second packet belongs to the session. Additionally, each router determines, based on the packet capture indicator for the session, whether packet capture is to be performed for the session. If the packet capture indicator indicates that packet capture is to be performed for the session, each router stores, in a respective packet capture record for the session, at least a portion of the second packet. Each router forwards the second packet without modifying the second packet to include the first portion of metadata or the second portion of metadata. Further, each router transmits the packet capture record for the session to a traffic data collector. Therefore, the traffic data collector may receive, from each router of the plurality of routers that forward packets of the session, a session-specific packet capture record comprising the packets received by the respective router for the session (and not packets for other, different sessions). The collector may use such session-specific packet capture records to perform traffic engineering, network health and monitoring, assist troubleshooting of the network, or other operations.

The techniques of the disclosure may provide specific improvements to the computer-related field of computer networking and path selection that have practical applications. For example, the techniques of the disclosure may enable a router to perform packet capture on a per-session basis such that the router may generate packet capture records for each session for which the router receives packets. In this fashion, each router within the network may provide a view of each session, including both forward and reverse packet flows, from the perspective of each router. By transmitting, to a collector, a different packet capture record for each session for which the router receives packets, instead of a packet capture record for each packet flow received by the router, the router may reduce the amount of network resources consumed by transmitting such session-based packet capture records. Additionally, the use of session-based packet capture records may allow the collector to obtain more accurate information about the behavior of the traffic within the network, thereby enabling the collector to perform a more comprehensive and accurate analysis of the network, which may increase the efficiency of traffic engineering and routing and allow for more accurate health monitoring and troubleshooting of the network.

Furthermore, a session-based router which modifies a packet to include a packet capture indicator, as described herein, may enable an administrator to enable session-specific packet capture on each router along a path for network traffic associated with the session, without requiring manual configuration of each router such as may be required for tunnel-based routing schemes. Additionally, the techniques disclosed herein may provide fine-grained control of how packet capture is performed in a way that provides increased flexibility over conventional techniques. For example, a router may perform a session-based packet capture for a only specific service, tenant, or other property, thereby providing increased control over the type of packets that are recorded.

In one example, this disclosure describes a method comprising: receiving, by a first network device of a plurality of network devices of a network connecting a first client device to a second client device, a first packet of a forward packet flow for a session between the first client device and the second client device, the session comprising the forward packet flow and a reverse packet flow; modifying, by the first network device, the first packet to include: a header comprising a source address that is an address of the first network device and a destination address that is an address of a second network device of the plurality of network devices; a first portion of metadata specifying a session identifier for the session; and a second portion of metadata comprising a packet capture indicator that indicates whether packet capture is to be performed for the session; and forwarding, by the first network device, the modified first packet.

In another example, this disclosure describes a method comprising: receiving, by a second network device of a plurality of network devices of a network connecting a first client device to a second client device and from a first network device of the plurality of network devices, a first packet of a forward packet flow for a session between the first client device and the second client device, the session comprising the forward packet flow and a reverse packet flow, wherein the first packet comprises: a header comprising a source address that is an address of the first network device and a destination address that is an address of the second network device; a first portion of metadata specifying a session identifier for the session; and a second portion of metadata comprising a packet capture indicator that indicates whether packet capture is to be performed for the session; determining, by the second network device and based on the packet capture indicator, that packet capture is to be performed for the session; storing, by the second network device, based on the determination that packet capture is to be performed for the session, an indication that packet capture is to be performed for the session; and storing, by the second network device and based on the indication that packet capture is to be performed for the session, at least a portion of the first packet.

In another example, this disclosure describes a first network device comprising processing circuitry configured to: receive a first packet of a forward packet flow for a session between a first client device and a second client device, the session comprising the forward packet flow and a reverse packet flow, wherein a plurality of network devices of a network connecting the first client device to the second client device comprise the first network device and a second network device; modify the first packet to include: a header comprising a source address that is an address of the first network device and a destination address that is an address of a second network device of the plurality of network devices; a first portion of metadata specifying a session identifier for the session; and a second portion of metadata comprising a packet capture indicator that indicates whether packet capture is to be performed for the session; and forward the modified first packet.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
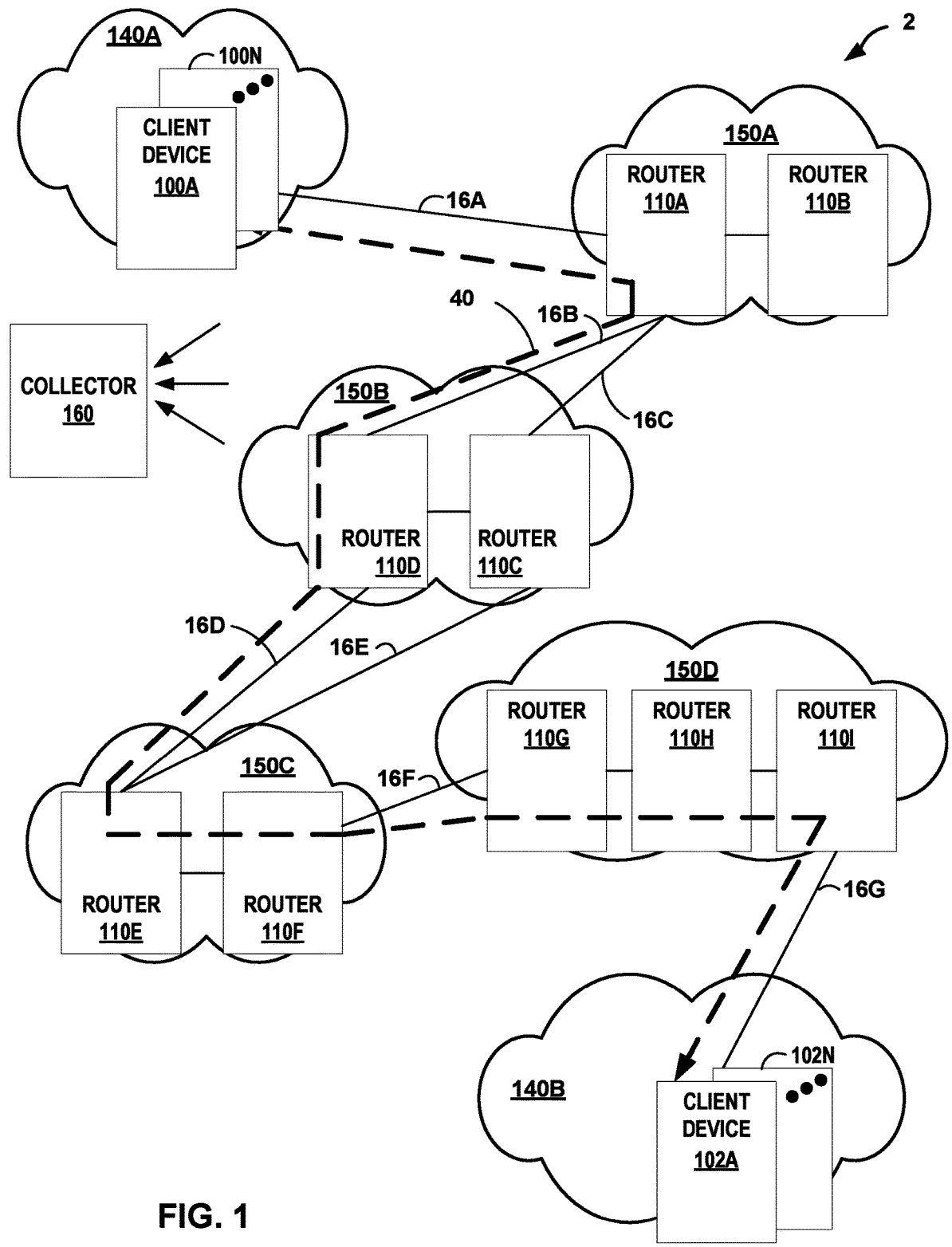
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes service provider networks 150A-150D (collectively, "service provider networks 150") configured to provide Wide Area Network (WAN) connectivity to disparate customer networks 140A-140B (collectively, "customer networks 140"). Routers 110A-110I (collectively, "routers 110") of service provider networks 150 provide client devices 100A-100N (collectively, "client devices 100") and client devices 102A-102N (collectively, "client devices 102") associated with customer networks 140 with access to service provider networks 150. In some examples, customer networks 140 are enterprise networks. Client devices 100, 102 and/or routers 110 may communicate with communication links 16A-16G (collectively, links "16"), which may be Ethernet, ATM or any other suitable network connections.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100 and 102, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, client devices 102 comprise servers executing one or more network service instances. The network service instances may apply one or more network services to traffic of client devices 100. Each network service instance may be, e.g., a virtualized network service instantiated by a virtual machine executed by processing circuitry of a client device 102. In some examples, the network service instances are a plurality of firewall instances that provide stateful firewall services to traffic of client devices 100. In some examples, the network service instances are a plurality of deep packet inspection instances that provide deep packet inspection services to traffic of client devices 100.

Traffic data collector 160 collects data records for network traffic of computer network system 2. In some examples, collector 160 or an analysis application (not shown) can use various information, metrics, or statistics about the network traffic to determine various aspects of the network traffic, which may be used to, e.g., perform traffic engineering, analytics and health monitoring, deep packet inspection, etc.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100A of system 2 establishes session 40 with client device 102A. Routers 110 facilitate establishment of session 40 by transporting network traffic between client device 100A and client device 102A. In some examples, client device 100A may be considered a "source" device and client device 102A may be considered a "destination device" in that client device 100A originates session 40 between client device 100A and client device 102A, e.g., client device 100A is the "source" of a packet of a forward packet flow of the session while client device 102A is the "destination" of the packet of the forward packet flow of the session. Client device 100A may be referred to as a "source device" and client device 102A may be referred to as a "destination device" through the disclosure. Session 40 includes a forward packet flow originating from client device 100A and destined for client device 102A and a reverse packet flow originating from client device 102A and destined for client device 100A. A forward packet flow for session 40 traverses a first path including, e.g., client device 100A, routers 110A-110I, and client device 102A. As described in more detail below, routers 110 enable the exchange of traffic between customer network 140A, across service provider networks 150, to customer network 140B.

Client device 100A (e.g., a source device) may establish session 40 with client device 102A (e.g., a destination device) according to one or more L2 or L3 communication session protocols, including Ethernet, TCP, or UDP. As described in more detail below, customer network 140A may form a first network and customer network 140B may form a second network. Routers 110 operate to extend customer network 140A across service provider networks 150 to customer network 140B. In this fashion, customer network 140A and customer network 140B may operate as if they were both part of the same network, even though customer network 140A and customer network 140B may be logically isolated and geographically separate from one another. Furthermore, routers 110 may operate such that the existence of service provider networks 150 between customer network 140A and customer network 140B is transparent to client devices 100, 102.

In some examples, routers 110 may extend session 40 across service provider networks 150 according to one or more communication session protocols, including TCP or UDP, etc. For example, to establish session 40 according to TCP such that data may be exchanged according to TCP, router 110A and router 110B perform a three-way handshake. Router 110A sends a first packet comprising a "SYN" flag to router 110B. Router 110B acknowledges receipt of the first packet by responding to router 110A with a second packet comprising a "SYN-ACK" flag. Router 110A acknowledges receipt of the second packet by responding to router 110B with a third packet comprising an "ACK" flag. After sending the third packet, session 40 is established according to TCP and routers 110A, 110B may exchange data with one another (e.g., by exchanging data packets of client device 100A and client device 102A) via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that router 110A does not verify that router 110B is capable of receiving data prior to transmitting data. To establish session 40 according to UDP, router 110A transmits a first packet to router 110B. Session 40 may be considered "established" according to UDP upon receipt by router 110A of any packet from router 110B, which implies that router 110B successfully received the first packet from router 110A, responded, and router 110A was able to receive the response from router 110B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for the forward packet flow originating from client device 100A and destined for client device 102A, router 110A determines whether the packet belongs to a new session (e.g., is the "first" packet or "lead" packet of session 40). In some examples, router 110A determines information included in the first packet (e.g., a source address, source port, destination address, destination port, and protocol) matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 102A, a protocol used by the first packet, an interface identifier of an interface of client device 100A from which the packet is forwarded, and a Virtual Local Area Network (VLAN) identifier to which client deice 100A is assigned. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI) or stateful firewall services.

In the example of FIG. 1, a stateful routing session may be established from ingress router 110A through one or more of intermediate routers 110C-110H to egress router 110I. In this example, router 110A determines that the first packet is an unmodified packet and the first packet of new session 40. Router 110A modifies the first packet to include metadata specifying the session identifier (e.g., the original source address, source port, destination address, destination port, and/or protocol) and/or other policy and control parameters. Router 110A replaces the header of the modified first packet to specify a source address that is an address of router 110A, a source port that is a port via which router 110A forwards the modified first packet toward server 103, a destination address that is an address of the next hop to which router 110A forwards the first packet (e.g., an address of router 110D), and a destination port that is a port of the next hop to which router 110A forwards the first packet (e.g., a port of router 110D). Additionally, router 110A stores the session identifier for session 40 and an indication of the selected next hop for session 40 (e.g., router 110D) such that, upon receiving subsequent packets for session 40, router 110A may identify the subsequent packets as belonging to the same session 40 and forward the subsequent packets along the same path as the first packet without modification to include the metadata.

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 102A. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 102A. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110D. Intermediate router 110D receives the modified first packet and determines whether the modified first packet includes metadata specifying the session identifier. In response to determining that the modified first packet includes metadata specifying the session identifier, intermediate router 110D determines that router 110D is not an ingress device such that router 110D does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 102A, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers 110C-110H process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100A.

A router 110 that may forward packets for a forward packet flow of the session to a destination for the packet flow is an egress, or "terminus" router. In the foregoing example, router 110I is a terminus router because router 110I may forward packets to client device 102A. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., client device 102A). Router 110I recovers the original first packet by removing the metadata from the modified first packet and using the metadata to modify the header of the first packet to specify the original source address, source port, destination address, and destination port. Router 110I forwards the recovered first packet to client device 102A. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S.

Patent Application Publication No. 2020/0403890, entitled "IN-LINE PERFORMANCE MONITORING," published on Dec. 24, 2020, the entire content of each of which is incorporated herein by reference in its entirety.

Additional information with respect to session-based routing and SVR is described in "Secure Vector Routing (SVR)," Internet Draft, Network Working Group, IETF, Oct. 1, 2021, available at https://datatracker.ietf.org/doc/draft-menon-svr, the entire contents of which are incorporated herein by reference.

Session-Based Packet Capture

Conventional packet capture techniques are performed on a per-packet flow basis. For example, a conventional router stores copies of packets (or portions thereof) and generates records of such stored packets organized by packet flow (e.g., such as by a 5-tuple header of the packet specifying a source address, source port, destination address, destination port, and network protocol of the packet). The router typically sends the packet flow records to a traffic flow collector, which uses the packet flow records to determine various aspects of the network traffic, which may be used to, e.g., perform traffic engineering, analytics and health monitoring, etc. However, transmitting packet records for each packet flow received by each router of the network may consume a large amount of network resources. Furthermore, records of individual packet flows does not provide a collector with a picture of the overall behavior of the bidirectional flow of traffic between the first client device and the second client device.

In accordance with the techniques of the disclosure, each router 110 generates packet capture records on a per-session basis for each session for which the router 110 receives packets. In one example, router 110A receives, from client device 100A, a first packet of a forward packet flow for session 40 between client device 100A and client device 102A. As described above, router 110A performs session-based routing of the first packet. For example, router 110A modifies the first packet to include a header comprising a source address that is an address of router 110A, a source port that is a port of router 110A, a destination address that is an address of router 110D, and a destination port that is an address of router 110D. Further, router 110A modifies the first packet to include a first portion of metadata specifying a session identifier for session 40.

Additionally, router 110A modifies the first packet to include a second portion of metadata comprising a packet capture indicator. The packet capture indicator indicates whether packet capture is to be performed for session 40, such that subsequent routers 110 (e.g., routers 110D-110I) may be informed of whether to perform packet capture for session 40, as will be discussed in more detail below. Typically, an administrator may provide an input specifying whether or not packet capture is to be performed for session 40. In other examples, a network policy, routing policy, security policy, or SLA may specify whether or not packet capture is to be performed for session 40. In the following examples, the packet capture indicator indicates that packet capture is to be performed for session 40.

Router 110A stores the packet capture indicator for the session. Router 110A stores, based on the packet capture indicator indicating that packet capture is to be performed for session 40, at least a portion of the first packet in a packet capture record for session 40. Router 110A then forwards the modified first packet to a next hop router 110 (e.g., router 110D).

Router 110D receives the modified first packet. Router 110D determines the modified first packet includes a first portion of metadata specifying the session identifier for session 40 and a second portion of metadata comprising the packet capture indicator and stores the session identifier and the packet capture indicator for the session specified by the first portion of metadata and second portion of metadata, respectively. Based on the packet capture indicator indicating that packet capture is to be performed for session 40, router 110D stores at least a portion of the first packet in a packet capture record for session 40. Router 110D then forwards the first packet to a next hop router (e.g., router 110E), whereupon router 110E processes the first packet in a similar fashion to determine, based on the packet capture indicator, that packet capture is to be performed for session 40, and store at least a portion of the first packet in a packet capture record for the session of the respective router 110.

Routers 110 forward the first packet in this fashion until router 110I receives the first packet. Router 110I processes the packet as described above to determine, based on the packet capture indicator, whether packet capture is to be performed for session 40, and if so, stores, in a packet capture record for the session, at least a portion of the first packet. Router 110I further determines, based on an adjacency to client device 102A, that router 110I is an egress router for session 40. In response to determining that router 110I is the egress router, router 110A removes the first portion and second portion of metadata from the first packet, restores the original header of the first packet based on the first portion of metadata to specify the source address and source port of client device 100A and the destination address and destination port of client device 102A, and forwards the first packet to the client device 102A.

Subsequently, each router 110 may receive a second packet associated with session 40. The second packet may belong to either the forward packet flow or the reverse packet flow of the session. Each router 110 may determine, based on the session information for session 40 stored by router 110, that the second packet belongs to the session. Additionally, each router 110 determines, based on the packet capture indicator stored with the session information for session 40, that packet capture is to be performed for session 40. In response to the determination, each router 110 stores, in a respective packet capture record for session 40, at least a portion of the second packet. Thereafter, each router 110 may forward the second packet to its next hop. As described above, typically routers 110 forward the second packet (and subsequent packets for the forward and/or reverse packet flows of session 40) without modifying the second packet to include the first portion of metadata or the second portion of metadata.

The packet capture record for session 40 may comprise stored packets (or portions thereof) of the forward packet flow and the reverse packet flow of session 40. Typically, the packet capture record for session 40 comprises records of packets of both the forward packet flow and the reverse packet flow of session 40 (e.g., a bidirectional flow records). However, in some examples, the packet capture record for session 40 may include packets of only the forward packet flow and not the reverse packet flow of session 40, or packets of only the reverse packet flow and not the forward packet flow of session 40 (e.g., a unidirectional flow record).

Router 110A transmits the packet capture record for session 40 to traffic data collector 160. Each other router 110 that receives or transmits a packet of the forward packet flow and the reverse packet flow of session 40 may also generate and transmit a packet capture record for session 40, such as routers 110D-110I. In some examples, each router 110 transmits a different packet capture record for each different session for which the router receives or transmits packets of the session. In this fashion, traffic data collector 160 may receive, from each router 110, a plurality of packet capture records that are session-specific, in that each packet capture record comprises the packets of a forward packet flow and a reverse packet flow of a particular session received by the router (e.g., and not packets for other, different sessions). The collector may use such session-specific packet capture records to perform traffic engineering, network health and monitoring, assist troubleshooting of the network, or other operations.

In the foregoing example, the packet capture indicator indicates that packet capture is to be performed for session 40. However, in other examples, the packet capture indicator may indicate that packet capture is not to be performed for a session, and in such examples, each router 110 does not perform packet capture for the session.

Figure 2:
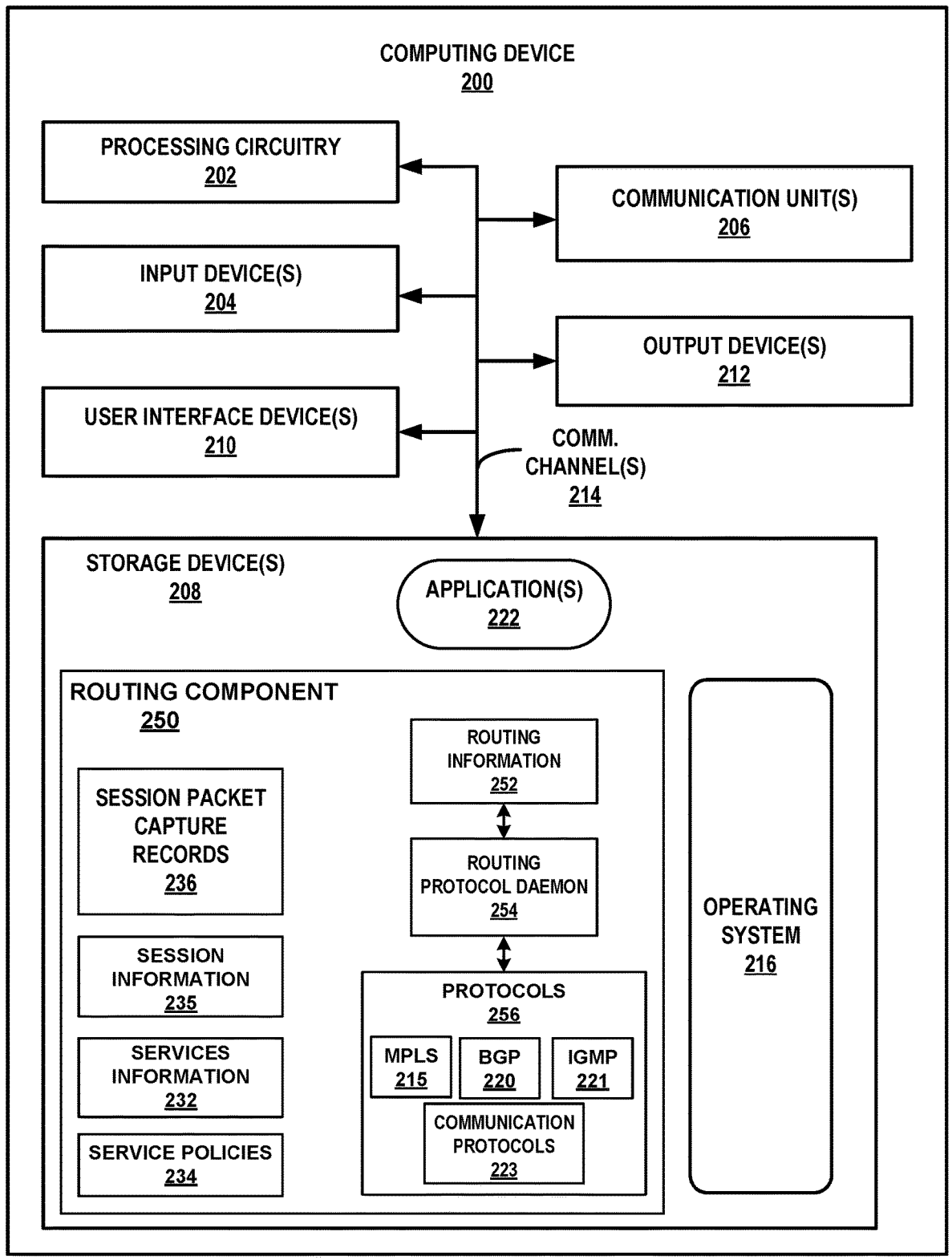
FIG. 2 is a block diagram illustrating an example router in accordance with the techniques of the disclosure.

FIG. 2 is a block diagram illustrating an example computing device 200 in accordance with the techniques of the disclosure. In general, computing device 200 may be an example implementation of one of routers 110 of FIG. 1. FIG. 2 illustrates a particular example of a server or other computing device 200 that includes processing circuitry 202 for executing any one or more of applications 222, routing component 250, or any other computing device described herein. Other examples of computing device 200 may be used in other instances.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., VirtIO and SRIOV network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input devices 204, one or more communication units 206, one or more output devices 212, one or more storage devices 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, are configured to implement functionality and/or process instructions for execution within computing device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories. In some examples, storage device 208 is used to store program instructions for execution by processing circuitry 202. Storage device 208, in one example, is used by software or applications running on computing device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 206. Computing device 200, in one example, utilizes communication units 206 to communicate with external devices via one or more networks, such as one or more wired/wireless/mobile networks. Communication units 206 may include a network interface, such as an Ethernet card, an optical transceiver, a radio frequency transceiver, or any other type of device that can send and receive information. Other examples of such network interfaces may include 3G and WiFi radios. In some examples, communication units 206 my include a plurality of high-speed network interface cards. In some examples, computing device 200 uses communication unit 206 to communicate with an external device. For example, computing device 200 uses communication unit 206 to communicate with other routers 110 and/or client devices 100 of FIG. 1 via links 16 of FIG. 1 with which communication unit 206 is connected.

Computing device 200, in one example, also includes one or more user interface devices 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen.

In some examples, a user such as an administrator of service provider networks 150 may enter configuration data for computing device 200.

One or more output devices 212 may also be included in computing device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit 206, storage device 208, input device 204, user interface devices 210, and output device 212. Applications 222 may also include program instructions and/or data that are executable by computing device 200.

In some examples, processing circuitry 202 executes routing component 250, which determines routes of received packets and forwards the packets accordingly. Routing component 250 communicates with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 executes software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols, such as TCP, UDP, TLS, or ICMP.

Routing information 252 may describe a topology of the computer network in which computing device 200 resides, and may also include routes through the shared trees in the computer network. Routing information 252 describes various routes within the computer network, and the appropriate next hops for each route, i.e., the neighboring routing devices along each of the routes. Routing information 252 may be a radix tree programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

In accordance with the techniques of the disclosure, routing component 250 generates packet capture records on a per-session basis for each session for which routing component 250 receives packets. As an example, computing device 200 operates as ingress router 110A of FIG. 1. In this example, routing component 250 receives, via communication units 206, a first packet of a forward packet flow for session 40 between, e.g., client device 100A and client device 102A of FIG. 1. Routing component 250 performs session-based routing of the first packet. For example, routing component 250 modifies the first packet to include a header comprising a source address that is an address of computing device 200, a source port that is a port of computing device 200, a destination address that is an address of a next hop router (e.g., router 110D of FIG. 1), and a destination port that is an address of the next hop router (e.g., router 110D of FIG. 1). Further, routing component 250 modifies the first packet to include a first portion of metadata specifying a session identifier for session 40. Routing component 250 stores the session identifier in an entry for session 40 within session information 235.

Additionally, and as described within U.S. Provisional Application No. 63/106,765, routing component 250 modifies the first packet to include a second portion of metadata specifying a packet capture indicator. The packet capture indicator indicates whether packet capture is to be performed for session 40, such that other routers 110 that receive the first packet including the packet capture indicator may be informed of whether to perform packet capture for session 40. Typically, an administrator may provide an input specifying whether or not packet capture is to be performed for session 40. In other examples, a network policy, routing policy, security policy, or SLA may specify whether or not packet capture is to be performed for session 40. In the following examples, the packet capture indicator indicates that packet capture is to be performed for session 40. However, in other examples, the packet capture indicator may indicate that packet capture is not to be performed for a session, and in such examples, routing component 250 (and other routers 110) do not perform packet capture for the session.

Routing component 250 stores the packet capture indicator in the entry for session 40 within session information 235. Although described as storing the packet capture indicator in the entry for session 40 within session information 235, in other examples the packet capture indicator may be stored separately from and associated with the entry for session 40. Routing component 250 stores, based on the packet capture indicator indicating that packet capture is to be performed for session 40, the first packet (or a portion thereof) in a packet capture record for session 40 within session packet capture records 236. Routing component 250 forwards the modified first packet to the next hop router 110 via communication units 206.

In some examples, and as described in U.S. Provisional Application No. 63/106,765, routing component 250 implements a session-based filter which specifies one or more sessions for which routing component 250 is to perform packet capture. Upon receipt of a first packet matching one or more criteria of such a filter, routing component 250 modifies the first packet to include the second portion of metadata specifying a packet capture indicator, stores the packet capture indicator in the entry for session 40 within session information 235, stores the first packet (or a portion thereof) in a packet capture record for session 40 within session packet capture records 236, and forwards the modified packet as described above.

In another example, computing device 200 operates as an intermediate router (e.g., such as routers 110D-110H) or an egress router (e.g., such as router 110I of FIG. 1). In the following example, computing device 200 is described as operating as router 110D of FIG. 1. In this example, routing component 250 receives, via communication units 206 and from router 110A, the first packet of the forward packet flow for session 40. The first packet includes a header comprising a source address that is an address of router 110A, a source port that is a port of router 110A, a destination address that is an address of computing device 200, and a destination port that is an address of computing device 200. Further, the first packet comprises a first portion of metadata specifying a session identifier for session 40. Routing component 250 stores the session identifier in an entry for session 40 within session information 235.

Additionally, the first packet comprises a second portion of metadata specifying a packet capture indicator. In the following examples, the packet capture indicator indicates that packet capture is to be performed for session 40. However, in other examples, the packet capture indicator may indicate that packet capture is not to be performed for a session, and in such examples, routing component 250 (and other routers 110) does not perform packet capture for the session. Routing component 250 stores the packet capture indicator in the entry for session 40 within session information 235. Routing component 250 stores, based on the packet capture indicator indicating that packet capture is to be performed for session 40, the first packet (or a portion thereof) in a packet capture record for session 40 within session packet capture records 236. Routing component 250 forwards the modified first packet to a next hop router 110 (e.g., router 110E of FIG. 1) via communication units 206.

In another example, routing component 250 receives a second packet via communication units 206. In this example, computing device 200 may operate an ingress router (e.g., router 110A of FIG. 1), an intermediate router (e.g., such as routers 110D-110H) or an egress router (e.g., such as router 110I of FIG. 1). Typically, the second packet (and subsequent packets for the forward and/or reverse packet flows of session 40) does not include the first portion of metadata or the second portion of metadata. Routing component 250 determines, based on a header of the second packet and the session identifier of the entry for session 40 stored within session information 235, that the second packet is associated with session 40. For example, routing component 250 determines that the second packet belongs to either the forward packet flow or the reverse packet flow of session 40.

Routing component 250 determines, based on the packet capture indicator of the entry for session 40 stored within session information 235, that packet capture is to be performed for session 40. In response to the determination, routing component 250 stores, the second packet (or a portion thereof) in a respective packet capture record for session 40 within session packet capture records 236. Routing component 250 forwards the second packet to a next hop for the second packet via communication units 206.

As described above, typically routing component 250 forwards the second packet (and subsequent packets for the forward and/or reverse packet flows of session 40) without modifying the second packet to include the first portion of metadata or the second portion of metadata. For example, where the second packet belongs to the forward flow of session 40 and is received from client device 100A of FIG. 1, routing component 250 forwards the second packet to a next hop router 110 for the second packet (e.g., router 110D of FIG. 1). As another example, where the second packet belongs to the reverse flow of session 40 and is received from a previous-hop router 110 (e.g., router 110D of FIG. 1), routing component 250 forwards the second packet to, e.g., client device 100A of FIG. 1.

The packet capture record for session 40 comprises the stored packets (or portions thereof) of the forward packet flow and the reverse packet flow of session 40 received by routing component 250. Routing component 250 outputs the packet capture record for session 40 to, e.g., traffic data collector 160 of FIG. 1 for collection and analysis. In some examples, routing component 250 transmits a different packet capture record for each different session for which routing component 250 receives or transmits packets of the session. In this fashion, routing component 250 may generate a plurality of packet capture records that are session-specific, in that each packet capture record comprises the packets of a forward packet flow and a reverse packet flow of a particular session received by routing component 250 (e.g., and not packets for other, different sessions).

In some examples, and as described within page 16, line 16 through page 17, line 14 of U.S. Provisional Application No. 63/106,765, routing component 250 implements a logger component which stores the packets (or portions thereof) of session 40 within the packet capture record for session 40 within session packet capture records 236. In some examples, the packet capture record comprises a packet capture (pcap) file. In some examples, and as described within page 18, line 10 through page 19, line 2 of U.S. Provisional Application No. 63/106,765, the logger component stores only a portion of each packet received for the forward packet flow and/or reverse packet flow of session 40. For example, the logger component of routing component 250 may generate a packet capture record for session 40 that includes one or more of a destination IP address, a source IP address, a source port (or port range), a destination port (or port range), a previous-hop router 110 (e.g., a router 110 from which computing device 200 received the packet), a packet count for session 40, a network protocol used by the packet, or a session count (e.g., a number of sessions logged), or other metrics not specifically described herein.

Figure 3:
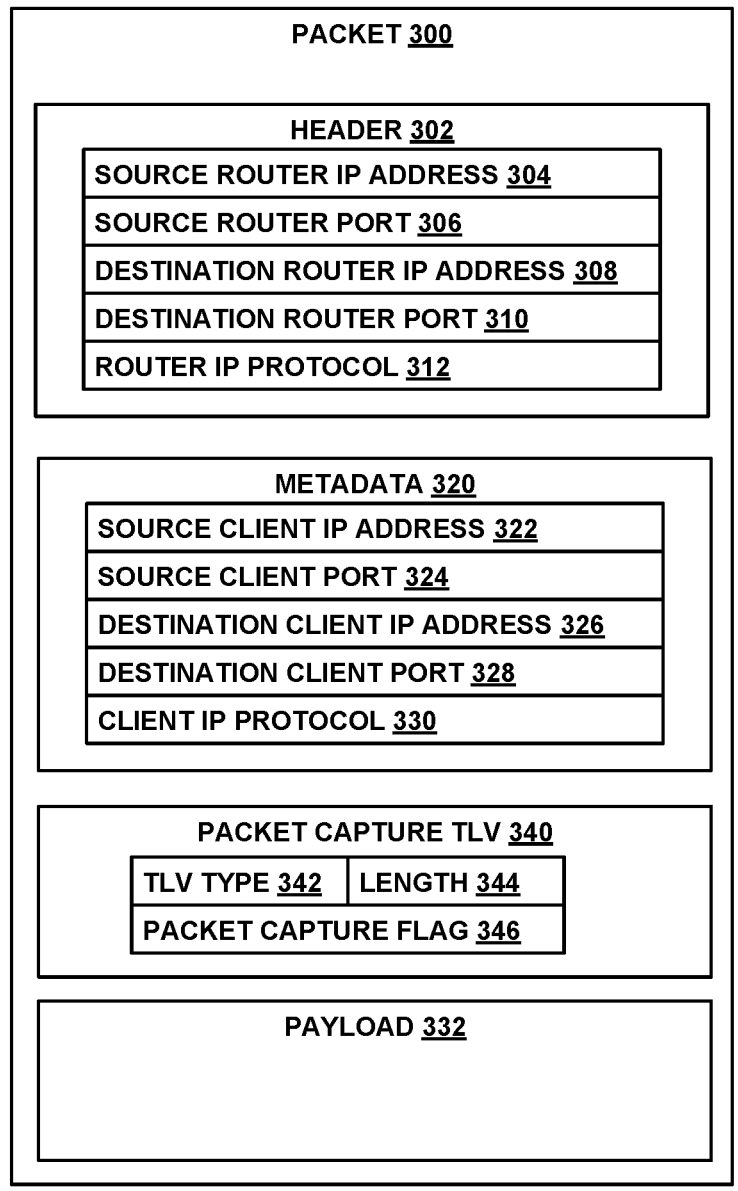
FIG. 3 is a block diagram illustrating an example packet generated in accordance with the techniques of the disclosure.

FIG. 3 is a block diagram illustrating an example packet 300 generated in accordance with the techniques of the disclosure. Packet 300 includes header 302, metadata 320, packet capture TLV data field 340, and data payload 332.

Header 302 specifies source router IP address 304 indicative of a device originating packet 300, source port 306 indicative of a port of the originating device from which packet 300 egresses, destination router IP address 308 indicative of a device to which packet 300 is destined, destination port 310 indicative of a port of destination device to which packet 300 is destined, and router IP protocol 312, which specifies a protocol used by packet 300. In some examples, router IP protocol 312 specifies one of TCP or UDP.

Metadata 320 specifies source client IP address 322, source client port 324, destination client IP address 326, destination client port 328, and client IP protocol 330. Source client IP address 322 and source client port 324 specify an IP address and port of the device originating packet 300, respectively. Destination client IP address 326 and destination client port 328 specify an IP address and port of the device to which packet 300 is destined, respectively. Client IP protocol 330 specifies a protocol used by source client IP address 322, source client port 324, destination client IP address 326, and destination client port 328. In some examples, client IP protocol 330 specifies one of TCP or UDP.

As described above with reference to FIG. 1, in some examples, router 110A receives a packet from client device 100 and modifies the packet to packet 300. For example, router 110A modifies source router IP address 304 and source port 306 to specify an IP address of router 110A and port used by router 110A to forward packet 300, respectively. Router 110A further modifies destination router IP address 308 and destination port 310 to specify an IP address and port of router 110B to which packet 300 is destined, respectively.

Additionally, router 110A modifies the received packet to include metadata 320. Source client IP address 322 and source client port 324 of metadata 320 specify an IP address and port of client device 100A, respectively. Destination client IP address 326 and destination client port 328 of second metadata 320 specify an IP address and port of client device 102A, respectively. As described above, routers 110 of FIG. 1 may use metadata 320 as a session identifier to identify a session associated with packet 300 so as to perform session-based routing of packet 300 and subsequent packets.

In some examples, router 110A further modifies the received packet to include packet capture TLV data field 340. Packet capture TLV data field 340 is a Type/Length/ Value (TLV) triplet comprising TLV type 342, TLV length 344, and packet capture flag 346. TLV type 342 may have a length of one octet and specifies a unique identifier (e.g., the "type" of the TLV) for the new TLV defined herein for indicating packet capture. As an example, TLV Type 342 is 0×01. TLV Length 344 may have a length of one octet and specifies a total number of octets of packet capture flag 346 (e.g., a "length" of the TLV). Packet capture flag 346 is a "value" field for the new TLV that specifies whether or not packet capture is to be performed for the session corresponding to packet 300 in accordance with the techniques of the disclosure. In some examples, packet capture flag 346 comprises a Boolean data type (e.g., true/false), wherein a value of "true" indicates that packet capture is to be performed for the session associated with the packet, and a value of "false" indicates that packet capture is not to be performed for the session associated with the packet, or vice versa.

Figure 4:
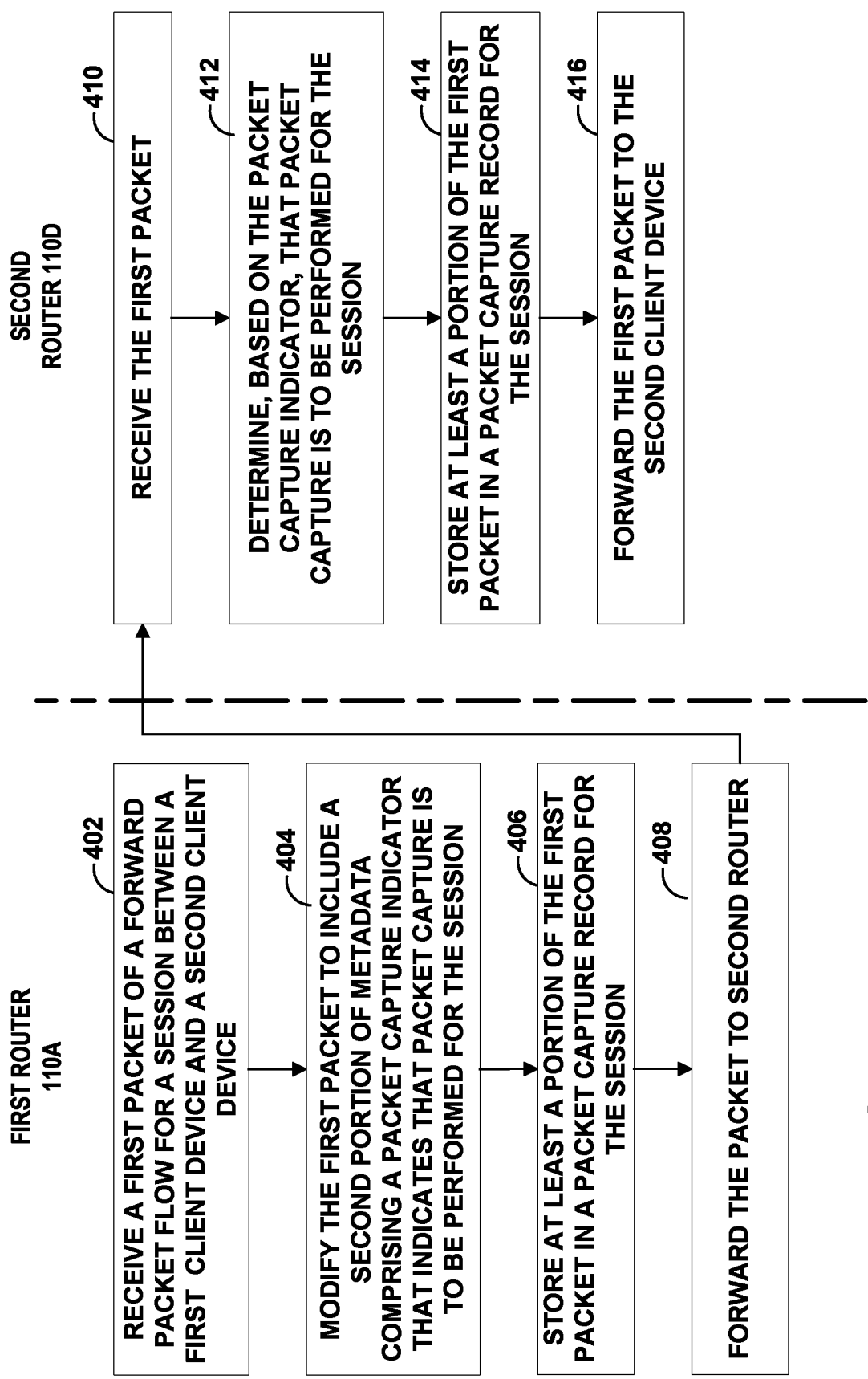
FIG. 4 is a flowchart illustrating an example operation in accordance with the techniques of the disclosure.

FIG. 4 is a flowchart illustrating an example operation in accordance with the techniques of the disclosure. FIG. 4 is described with respect to the example of FIG. 1, for convenience. As depicted in the example of FIG. 1, first router 110A receives a first packet of a forward packet flow for session 40 between first client device 100A and second client device 102A (402). First router 110A performs session-based routing of the first packet. For example, first router 110A modifies the first packet to include a header comprising a source address that is an address of first router 110A, a source port that is a port of first router 110A, a destination address that is an address of second router 110D, and a destination port that is an address of second router 110D. Further, first router 110A modifies the first packet to include a first portion of metadata specifying a session identifier for session 40. First router 110A stores the session identifier in an entry for the session within session information of router 110A.

First router 110A modifies the first packet to include a second portion of metadata comprising a packet capture indicator that indicates that packet capture is to be performed for session 40 (404). The packet capture indicator indicates whether packet capture is to be performed for session 40. In some examples, first router 110A modifies the first packet to include the second portion of metadata in response to an input by an administrator. First router 110A stores the packet capture indicator in the entry for the session within session information of router 110A. Further, first router 110A stores at least a portion of the first packet in a packet capture record for session 40 (406) and forwards the first packet to second router 110D (408).

Second router 110D receives, from first router 110A, the first packet (410). Second router 110D stores the session identifier specified by the first portion of metadata of the first packet and the packet capture indicator specified by the second portion of metadata of the first packet in an entry for the session within session information of router 110D.

Second router 110D determines, based on the packet capture indicator within the first packet, that packet capture is to be performed for session 40 (412). Based on the determination, second router 110D stores at least a portion of the first packet in a packet capture record for session 40 (414). Second router 110D forwards the first packet to second client device 102A (416) (e.g., by forwarding the first packet to router 110E for forwarding toward second client device 102A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a first network device of a plurality of network devices of a network connecting a first client device to a second client device, a first packet of a forward packet flow for a session between the first client device and the second client device, the session comprising the forward packet flow and a reverse packet flow, wherein the first packet comprises a header and a data payload;
modifying, by the first network device, the header of the first packet to specify a source address that is an address of the first network device and a destination address that is an address of a second network device of the plurality of network devices;
inserting, by the first network device, a first portion of metadata after the modified header and before the data payload, the first portion of metadata specifying a session identifier for the session;
inserting, by the first network device, a second portion of metadata after the modified header and before the data payload, the second portion of metadata comprising a packet capture indicator indicating that packet capture is to be performed for the session;
storing, by the first network device, the packet capture indicator indicating that packet capture is to be performed for the session;
storing, by the first network device and based on the stored packet capture indicator indicating that packet capture is to be performed for the session, at least a portion of the first packet in a packet capture record for the session;
forwarding, by the first network device, the modified first packet;
receiving, by the first network device, a second packet for the session;
determining, by the first network device, that the second packet belongs to the session;
storing, by the first network device and based on the stored packet capture indicator indicating that packet capture is to be performed for the session, at least a portion of the second packet in the packet capture record for the session; and
forwarding, by the first network device, the second packet without the first portion of metadata or the second portion of metadata.

2. The method of claim 1, further comprising:
receiving, by the first network device, an input specifying that packet capture is to be performed for the session,
wherein storing the packet capture indicator indicating that packet capture is to be performed for the session is in response to the input, and
wherein inserting the second portion of metadata is based at least in part on the packet capture indicator indicating that packet capture is to be performed for the session.

3. The method of claim 2, further comprising:
storing, by the first network device, the session identifier for the session,
wherein determining that the second packet belongs to the session is based on the stored session identifier.

4. The method of claim 1,
wherein the second packet is a second packet of the forward packet flow for the session,
wherein receiving the second packet comprises receiving, from the first client device, the second packet, and
wherein forwarding the second packet comprises forwarding, to the second network device, the second packet.

5. The method of claim 1,
wherein the second packet is a second packet of the reverse packet flow for the session,
wherein receiving the second packet comprises receiving, from the second network device, the second packet, and
wherein forwarding the second packet comprises forwarding, to the first client device, the second packet.

6. The method of claim 1, further comprising:
storing, by the first network device, at least a portion of each subsequent packet of the forward packet flow and the reverse packet flow for the session in the packet capture record for the session;
forwarding each subsequent packet of the forward packet flow and the reverse packet flow for the session without the first portion of metadata or the second portion of metadata; and
outputting, by the first network device and to a traffic data collector, the packet capture record for the session.

7. The method of claim 1, wherein the packet capture indicator comprises a Type/Length/Value (TLV) triplet comprising a type field, a length field, and a packet capture flag field.

8. A method comprising:
receiving, by a second network device of a plurality of network devices of a network connecting a first client device to a second client device and from a first network device of the plurality of network devices, a first packet of a forward packet flow for a session between the first client device and the second client device, the session comprising the forward packet flow and a reverse packet flow, wherein the first packet comprises:
  a header comprising a source address that is an address of the first network device and a destination address that is an address of the second network device;
  a data payload;
  a first portion of metadata after the header and before the data payload, the first portion of metadata specifying a session identifier for the session; and
  a second portion of metadata after the header and before the data payload, the second portion of metadata comprising a packet capture indicator indicating that packet capture is to be performed for the session;
determining, by the second network device and based on the packet capture indicator, that packet capture is to be performed for the session;
storing, by the second network device and based at least in part on the determination that packet capture is to be performed for the session, the packet capture indicator indicating that packet capture is to be performed for the session;
storing, by the second network device and based at least in part on the indication that packet capture is to be performed for the session, at least a portion of the first packet in a packet capture record for the session;
forwarding, by the second network device, the modified first packet
receiving, by the second network device, a second packet for the session, wherein the second packet does not include the first portion of metadata or the second portion of metadata;
determining, by the second network device, that the second packet belongs to the session;
storing, by the second network device and based on the stored packet capture indicator indicating that packet capture is to be performed for the session, at least a portion of the second packet in the packet capture record for the session; and
forwarding, by the second network device, the second packet without the first portion of metadata or the second portion of metadata.

9. The method of claim 8, further comprising:
modifying, by the second network device and based at least in part on the first portion of metadata, the header of the first packet to specify a source address that is an address of the first client device and a destination address that is an address of the second client device;
removing, by the second network device, the first portion of metadata and the second portion of metadata from the first packet; and
forwarding, by the second network device, the first packet to the second client device without the first portion of metadata and the second portion of metadata.

10. The method of claim 8, further comprising:
storing, by the second network device, the session identifier for the session specified by the first portion of metadata of the first packet,
wherein determining that the second packet belongs to the session is based on the stored session identifier.

11. The method of claim 8,
wherein the second packet is a second packet of the forward packet flow for the session,
wherein receiving the second packet comprises receiving, from the first network device, the second packet, and
wherein forwarding the second packet comprises forwarding, to the second client device, the second packet.

12. The method of claim 8,
wherein the second packet is a second packet of the reverse packet flow for the session,
wherein receiving the second packet comprises receiving, from the second client device, the second packet, and
wherein forwarding the second packet comprises forwarding, to the first network device, the second packet.

13. The method of claim 8, further comprising:
storing, by the second network device and based on the determination that packet capture is to be performed for the session, at least a portion of each subsequent packet of the forward packet flow and the reverse packet flow for the session in the packet capture record for the session;
forwarding, by the second network device, each subsequent packet of the forward packet flow and the reverse packet flow for the session without the first portion of metadata or the second portion of metadata; and
outputting, by the second network device and to a traffic data collector, the packet capture record for the session.

14. The method of claim 8, wherein the packet capture indicator comprises a Type/Length/Value (TLV) triplet comprising a type field, a length field, and a packet capture flag field.

15. A first network device comprising processing circuitry configured to:
  receive a first packet of a forward packet flow for a session between a first client device and a second client device, the session comprising the forward packet flow and a reverse packet flow, wherein a plurality of network devices of a network connecting the first client device to the second client device comprise the first network device and a second network device, wherein the first packet comprises a header and a data payload;
  modify the header of the first packet to specify a source address that is an address of the first network device and a destination address that is an address of a second network device of the plurality of network devices;
  insert a first portion of metadata after the modified header and before the data payload, the first portion of metadata specifying a session identifier for the session;
  insert a second portion of metadata after the modified header and before the data payload, the second portion of metadata comprising a packet capture indicator indicating that packet capture is to be performed for the session;
  store the packet capture indicator indicating that packet capture is to be performed for the session;
  store, based on the stored packet capture indicator indicating that packet capture is to be performed for the session, at least a portion of the first packet in a packet capture record for the session;
  forward the modified first packet
  receive a second packet for the session;
  determine that the second packet belongs to the session;
  store, based on the stored packet capture indicator indicating that packet capture is to be performed for the session, at least a portion of the second packet in the packet capture record for the session; and
  forward the second packet without the first portion of metadata or the second portion of metadata.

16. The first network device of claim 15,
wherein the first network device further comprises a storage device, and
wherein the processing circuitry is further configured to receive an input specifying that packet capture is to be performed for the session;
wherein the processing circuitry is configured to store the packet capture indicator indicating that packet capture is to be performed for the session in the storage device in response to the input, and
wherein the processing circuitry is configured to insert the second portion of metadata based at least in part on the packet capture indicator indicating that packet capture is to be performed for the session.

17. The first network device of claim 16, wherein the processing circuitry is further configured to:
store, in the storage device, the session identifier for the session,
wherein the processing circuitry is configured to determine that the second packet belongs to the session based on the stored session identifier.

18. The first network device of claim 15,
wherein the second packet is a second packet of the reverse packet flow for the session,
wherein to receive the second packet, the processing circuitry is configured to receive, from the second network device, the second packet, and
wherein to forward the second packet, the processing circuitry is configured to forward, to the first client device, the second packet.

19. The first network device of claim 15,
wherein the processing circuitry is further configured to:
store, in the storage device, at least a portion of each subsequent packet of the forward packet flow and the reverse packet flow for the session in the packet capture record for the session;
forward each subsequent packet of the forward packet flow and the reverse packet flow for the session without the first portion of metadata or the second portion of metadata; and
output, to a traffic data collector, the packet capture record for the session.

\* \* \* \* \*